June 19, 1928.
N. PALMAFFY
1,673,948
VALVE
Filed Oct. 6, 1927
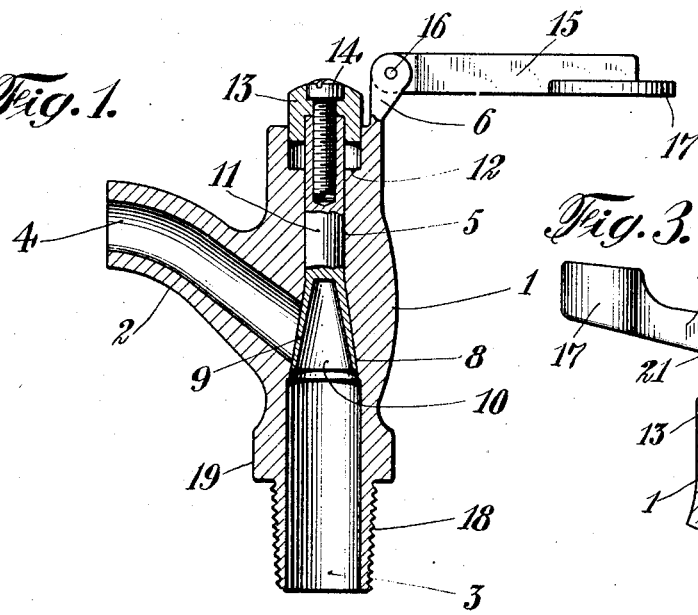
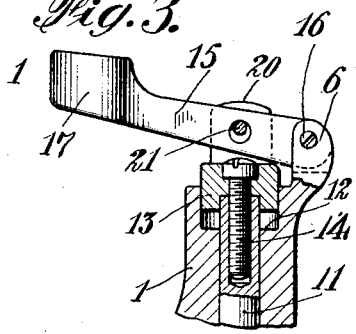
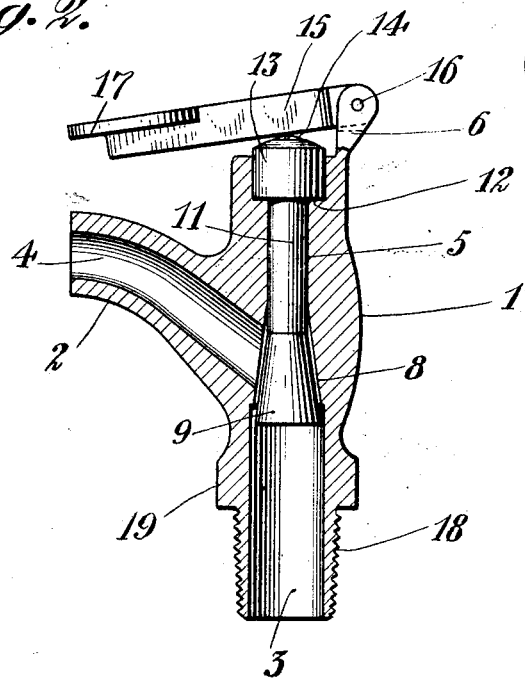
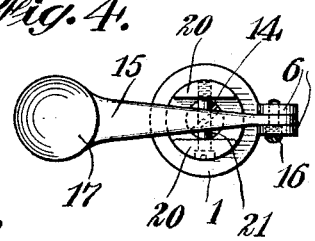
INVENTOR
Nicholas Palmaffy
BY
his ATTORNEY Patented June 19, 1928.

1,673,948

UNITED STATES PATENT OFFICE.

NICHOLAS PALMAFFY, OF WEST ORANGE, NEW JERSEY.

VALVE.

Application filed October 6, 1927. Serial No. 224,319.

My invention relates to valves, particularly valves for water faucets of such construction that the valve is normally held closed against the seat by pressure of the water itself when the valve is not forcibly held in open position.

This invention is an improvement upon the invention shown in my United States Patent No. 1,423,966 granted July 25, 1922; and has for its object to provide a valve that is made of few parts, is inexpensive to produce and of such design that it will move with readiness and certainty to closed position when released.

The nature of the invention is set forth in the following specification and illustrated in the accompanying drawings which show the best form of my improved valve now known to me. This disclosure, however, embraces or presents but two embodiments of my invention and I might make changes in the shape, size and arrangement of parts to the full extent indicated by the meaning of the terms in which the appended claim is expressed.

On the drawings, Fig. 1 is a vertical section taken through a valve according to my invention mounted in a water faucet, the valve being shown in closed position, Fig. 2 is a similar view with the valve in open position, Fig. 3 is a view similar to Fig. 2, showing the upper part of a modification; and Fig. 4 is a top view of what is shown in Fig. 3.

Same numerals identify the same parts throughout.

In a particular description of the drawing, numeral 1 indicates the body of the water faucet which is in the form of a hollow casing provided with a spout 2. Inside of the body or casing 1 is a bore 3 from the inner end of which leads the duct or channel 4 of the spout 2; the other end of the bore 3 being open for connection with the supply pipe. Communicating with the inner end of the bore 3 is another bore 5 of reduced diameter, this bore being in line with the bore 3 and extending from the bore 3 through the opposite end of the body 1; this bore 5 also communicating with the channel 4; and said opposite end of the body or casing carries a pair of apertured lugs 6. Preferably the casing 1 with the spout 2 and the lugs 6 is cast in one piece.

The inner end of the bore 5 adjacent the point of connection with the bore 3 and channel 4 is enlarged to provide a cone seat 8 which is engaged by a valve 9 of similar shape. The inner end of this valve has a hollow recess 10 therein and it is rigid with the stem 11 that passes through the bore 5 and projects out through the end of the casing which carries the lugs 6. The bore 5 at this end is enlarged to provide a shoulder 12 and within this enlarged portion is disposed a head 13 which is perforated to permit the passage of the screw or other fastening device into a threaded bore in the adjacent end of the stem 11 to secure this head and stem together. The length of the stem 11 between the head 13 when the head is secured by the screw 14 and the valve 9 is such that when the valve is in open position the head will engage and make contact with the shoulder 12; while when the valve is closed and engages the seat 8 the head will be separated from the shoulder 12 and project out more from the adjacent end of the casing 1. The lugs 6 serve to mount a lever 15 pivoted therein by means of a pin 16 passing through these lugs and this lever may have a suitable knob 17. At the end through which the bore 3 opens the casing is provided with a thread 18 and a polygonal section 19 to be engaged by a tool to enable the faucet to be screwed in place.

In practice when the faucet is connected to a water pipe the pressure of the water forces the valve 9 against the cone seat 8 and closes the entrance to the channel 4 of the spout 2. To open the valve one merely presses downward upon the lever which rests loosely upon the top of the head 13 and thus the stem 11 forces the valve to leave its seat 8 and uncover the channel through the spout 2. Then a flow can take place through the faucets and out from the spout.

The invention is suitable not only for water faucets but for faucets to control other liquids as well. The pressure of the liquid will always move the valve to closed position as soon as the lever 15 is released.

In Figures 3 and 4, the head 13 is made higher and is recessed on top to provide lugs 20, similar to lugs 6. The lugs 20 are perforated to receive a screw 21, which has threaded engagement with one lug so that the screw can pass through an opening in the lever 15, and the lever can be pivotally connected to the head. Otherwise this form is the same as the first form.

I claim:

The combination of a hollow body having an outlet channel, a cone shaped valve provided with a cone seat in said body, said valve being normally held against said seat to close said channel, a stem for said valve, said body having a bore through which said stem projects to the outside thereof, said bore being enlarged adjacent the outer end of said stem, a head in the enlarged portion of said bore, a screw passing through the head and having a screw-threaded engagement with the stem to hold the head on the stem and a lever to engage said head and open the valve.

In testimony that he claims the foregoing as his invention, he has signed his name hereto.

NICHOLAS PALMAFFY.